No. 869,107. PATENTED OCT. 22, 1907.
W. G. SHULTS.
EYEBOLT BENDING AND SWAGING MACHINE.
APPLICATION FILED MAR. 20, 1906.
2 SHEETS—SHEET 2.
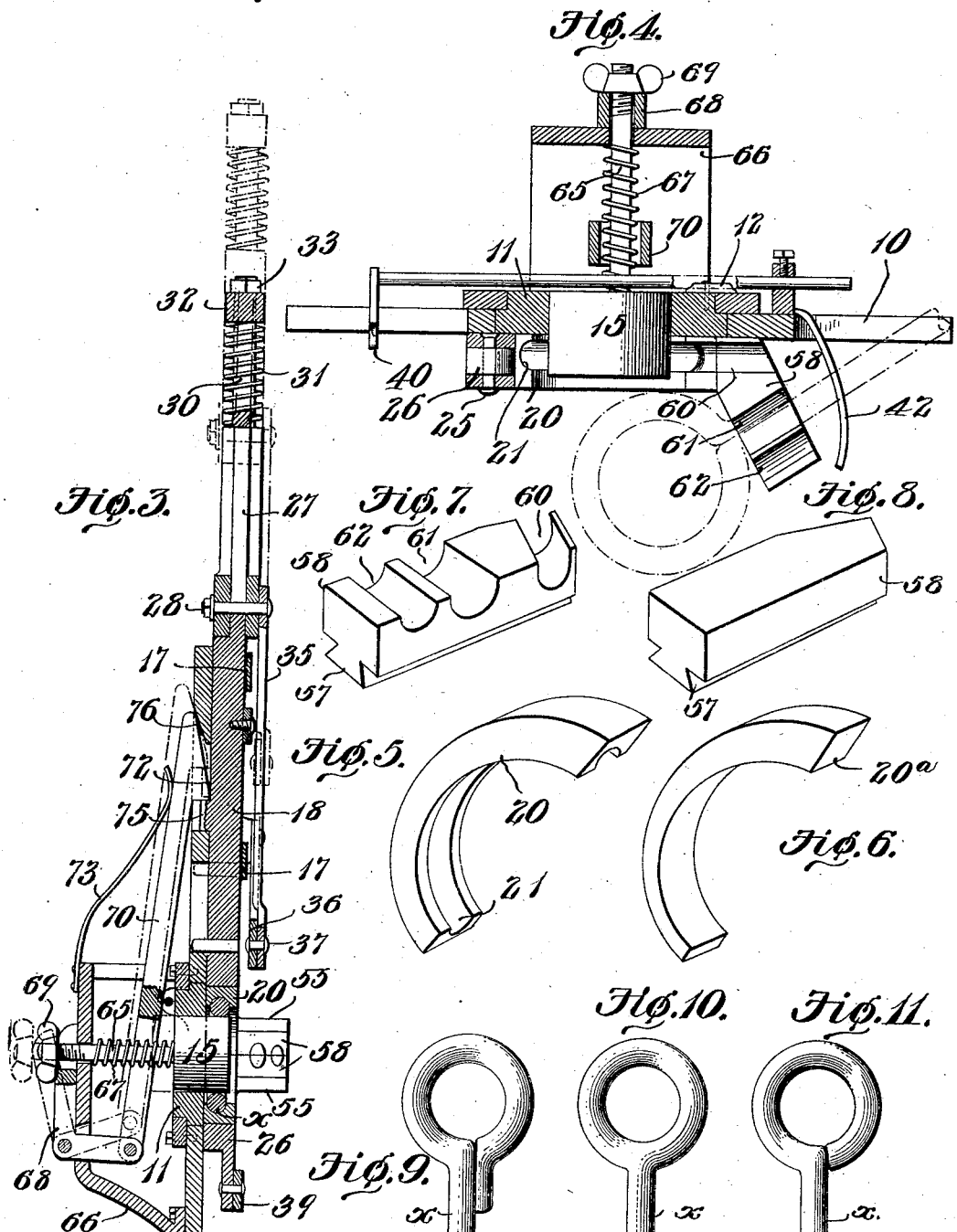
WITNESSES:
William G. Shults, INVENTOR
By C. A. Snow & Co.
ATTORNEYS
THE NORRIS PETERS CO., WASHINGTON, D. C.

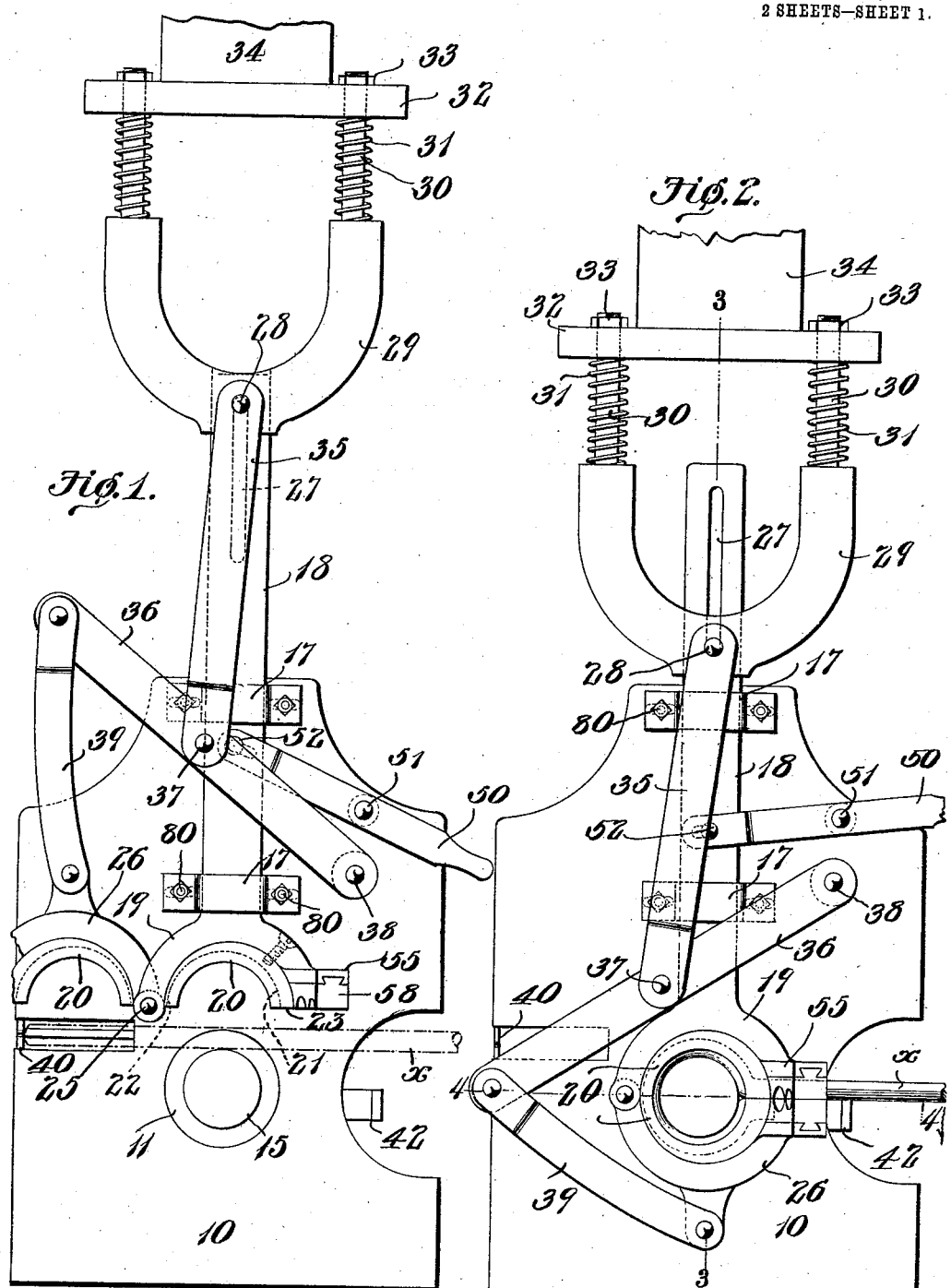

UNITED STATES PATENT OFFICE.

WILLIAM G. SHULTS, OF KNOXVILLE, TENNESSEE.

EYEBOLT BENDING AND SWAGING MACHINE.

No. 869,107.     Specification of Letters Patent.     Patented Oct. 22, 1907.

Application filed March 20, 1906. Serial No. 307,091.

*To all whom it may concern:*

Be it known that I, WILLIAM G. SHULTS, a citizen of the United States, residing at Knoxville, in the county of Knox and State of Tennessee, have invented a new and useful Eyebolt Bending and Swaging Machine, of which the following is a specification.

This invention relates to metal bending and swaging machines, and has for its principal object to provide a machine of simple construction by which eye bolts or the like may be rapidly manufactured from bars.

A further object of the invention is to provide a novel form of bending die arranged to bend a bar in the form of a complete, or practically complete circle around a suitable mandrel.

A still further object of the invention is to provide a machine in which the dies proper and the mandrel are interchangeable and adjustable for the purpose of forming eye bolts of different size, and for working bars of different diameter, and different cross sectional contour.

A still further object of the invention is to provide a novel mechanism for swaging and welding the eyes, and to so arrange and construct the machine as to provide for the employment of a number of swage dies of different shape and size to be successively employed as the welding progresses.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a front elevation of an eye bolt forming machine constructed in accordance with the invention, showing the parts arranged for the reception of a bar to be bent around to form an eye bolt. Fig. 2 is a similar view, showing the die members closed and the bar bent to form the eye. Fig. 3 is a vertical sectional view of the machine on the line 3—3 of Fig. 2. Fig. 4 is a sectional plan view of the machine on the line 4—4 of Fig. 2, showing the dies in which the eye bar is placed during the welding operation. Fig. 5 is a detail perspective view of one of the eye bending dies detached. Fig. 6 shows a similar die used for working flat metal. Fig. 7 is a detail perspective view of one of the swage dies to be employed during the welding operation. Fig. 8 is a view similar to Fig. 7, showing a modified form of die or anvil to be used when welding flat bars. Fig. 9 is an elevation showing the eye bolt after the completion of the bending operation. Fig. 10 is a similar view of the finished eye bolt.

Fig. 11 is an elevation of an eye bolt formed by simply bending the metal, and without subjecting the same to the welding operation.

Similar numerals of reference are employed to indicate corresponding parts throughout the several figures of the drawings.

The working parts of the machine are supported on a suitable frame, of which a portion is indicated at 10, and this portion of the frame is provided with a stepped opening for the reception of a stepped collar 11, which may be held in place by a turn button 12, or by suitable bolts, if desired. The collar has an opening for the passage of a mandrel 15, preferably cylindrical in form and forming the anvil around which the metallic bar is bent for the purpose of forming the eye bolt. The mandrel may be of any diameter, and other mandrels of different diameter, or of different shape may be readily substituted therefor it being necessary in such cases to employ additional collars 11 having openings of proper size to receive the mandrels, the external diameters of the collars being the same at all times.

The frame is provided with a pair of guide blocks 17, that are preferably adjustable, and said guide blocks are arranged for the reception of a vertically movable bar 18 that carries at its lower end a semi-circular block 19. This block is arranged to receive an approximately semi-circular die 20, the shape of which depends on the diameter and cross sectional contour of the bar from which the eye bolts are to be formed. The bending die 20 is shown as provided with a transverse cross sectional groove 21 to receive a round bar, and said die is preferably tapered in thickness from the thinnest end 22 to a relatively thick bar or block 23 at the opposite end. These dies may be held in place by bolts or other securing devices, and may be interchanged where eyebolts of different size and shape are to be made, a modification of the die being shown at 20ª in Fig. 6, where flat or rectangular bars are to be operated upon.

The rear end of the semi-circular block 19 is connected by a pivot pin 25 to a semi-circular block 26 that carries a die 20 of the same construction as that supported by the block 19, and the knife edges of these dies are adjacent the pivotal connection in order that buckling of the bar being worked may be prevented while the dies are moving from the position shown in Fig. 1 to the position shown in Fig. 2.

In the upper end of the bar 18 is a vertically elongated slot 27, through which passes a pin 28 that is rigidly connected to a U-shaped bar 29, the upper parallel arms of which are reduced and threaded at their upper ends, forming bolts 30 for the reception of helical compression springs 31. On the upper portions of the bolts 30 is mounted a cross bar 32, the lower face of which forms a bearing for the upper ends of the spring 31, and to the threaded upper ends of these bolts are attached nuts 33 by which the stress of the springs may be adjusted. This bar 32 is arranged at the lower end of a block 34 that may receive movement from any suitable source of power, the block being depressed for the purpose of actuating the bending dies during the bending operation, and for the subsequent welding.

Pivotally mounted on the pin 28 is the upper end of a link 35, the lower end of which is bifurcated and embraces a lever 36, the two being connected by a suitable pivot pin 37. One end of the lever is pivoted on a pin 38, projecting from the frame, and the opposite end thereof is connected to the block 26 by a slightly curved link 39.

In the operation of the machine, as thus far described, the bar of iron or other material, such as $x$, is placed on top of the mandrel 15, while the parts are in the position shown in Fig. 1, the bar being thrust inward until it engages an adjustable stop 40, the position of the stop determining the diameter of the eye to be made. The upper block 34 is now moved down, and allows the bar 18 and block 19 to descend by gravity against the bar $x$, the weight of these parts being sufficient to bend the bar around the upper portion of the mandrel. During this movement the U-shaped bar 29, being forced down positively, will transmit movement to the lower block 26 through the lever 36 and the connected links, and the die carried by the bar or block 26 will move around to the position shown in Fig. 2, carrying with it the partly bent bar $x$, and forcing the latter tightly around the mandrel, the end of the bar being forced against the body portion thereof, and the parts at this time assuming the position shown in Fig. 9. In order to hold the body of the bar from excessive upward or downward movement during this operation of the dies, a suitable rest 42 is secured to the frame and arranged to project across the plane of the bar and dies.

Where the bar of metal is of such thickness as to prevent the bending under the weight of the block 19 and bar 18, an auxiliary hand lever 50 may be employed, said lever being pivoted on a stud 51 projecting from the frame and having at its inner end a slot for the reception of a stud 52 projecting from the bar 18. The operator by grasping and thrusting the handle upward, may move the bar 18 and block 19 down with sufficient force to insure the proper bending of the bar over the top of the mandrel. The bar may be bent to the form shown in Fig. 9, or in some cases it may be bent to the form shown in Fig. 11, and for some purposes the eye bolt thus fashioned will answer. It is, however, desirable that the ends of the eye be welded together, and for this purpose suitable swaging dies are carried by the blocks 19 and 26. Each block 19 and 26 carries a horizontally projecting arm 55 that is disposed in a plane oblique to the plane of the axis of the mandrel, as will be evident on reference to Figs. 2 and 4, and these arms are provided with dove-tailed slots for the reception of dove-tailed ribs 57 that are formed at the backs of swaging dies 58. These swage dies have die recesses 60, 61 and 62, of different shape and size, the die recesses 60 being deeper than the recesses 61, and 62, and being arranged to receive the bar at the completion of the eye forming operation, as shown in Fig. 9, and the recesses 60 are furthermore disposed at an arcuate angle to the recesses 61 and 62, as will be apparent on reference to Figs. 4 and 7. The recesses 61 are of greater width than the recesses 62 in order that the metal may be properly supported and shaped during welding.

After the completion of the bending operation the mandrel is retracted in the manner hereinafter described, leaving the bar free, and the latter is then removed from the die recesses 60 and placed in the die recesses 61, while the block 34 is vibrated rapidly in much the same manner as a power hammer, and the blocks 19 and 26 are swung toward and from each other with the pivot 25 as a center, each block acting as an anvil for the other, and the work being turned during the welding operation. After a number of blows have been struck while the work is in the recesses 61, the partly completed eye bolt is moved to the recesses 62, and the hammering progresses until the welding and shaping of the eye bolt are completed.

In order to automatically release the eye bolt after the bending operation, the mandrel 15 is arranged to slide within a guiding opening of the collar 11. Said mandrel is provided at its rear end with a reduced stem 65, the outer end of which is guided in an opening formed in a bracket 66 carried by the frame 10, and between this bracket and the rear end of the mandrel is a helical compression spring 67 that tends to thrust the mandrel to its operative position. Pivoted to the brackets is a bell crank lever 68, having an approximately vertical arm that is bifurcated at its upper end to embrace the stem 65, and said stem is threaded for the reception of a thumb nut 69 which may be screwed close against the arm of the bell crank lever. The approximately horizontal arm of the bell crank lever carries a vertically disposed catch arm 70 that is bifurcated to straddle the stem 65 and spring 67, and the upper hooked end of this bar is engaged within a slot 72 formed in the frame plate by means of a leaf spring 73 carried by the bracket 66. This hook bar is arranged to be engaged by a lug 75 projecting from the rear face of the bar 18, and as the latter is raised at the completion of a bending operation, the lug will engage the catch bar, and the latter being raised, will move the bell crank lever to the dotted line position shown in Fig. 3, thus withdrawing the mandrel from its position within the eye. As the upward movement of the bar continues, the inclined upper end of the bar 72 will ride against the cam shaped end 76 of slot 72 and the catch bar will be freed from the lug, whereupon the spring 67 will thrust the mandrel out to its operative position in readiness for another operation.

The peculiar shape of the bending dies 20, that is to say, tapering in thickness from one end to the other, requires some adjusting of the guide blocks 17 when die members of different size or shape are employed, so that the centers from which the dies are struck may correspond to the axis of the mandrel when the dies are closed. For this purpose, the frame plate is preferably provided with slots for the passage of the bolts 80 by which the guide blocks are secured in place.

The apparatus forming the subject of the present invention may be advantageously employed in the manufacture of eye bolts having eyes of circular or other form and made from bars of any contour in cross section, and which may further be used for the manufacture of hinge leaves and like articles.

I claim:—

1. In a machine of the class described, a mandrel, a reciprocatory die arranged to coöperate with the mandrel, and a second die pivoted to said reciprocatory die and movable therewith, and means for swinging the second die into coöperative relation with the mandrel.

2. In a machine of the class described, the combination with a mandrel, of a semi-circular die carrying block movable toward and from the mandrel, a guide bar carrying said block, a second die carrying block pivoted to the first and arranged to swing around that portion of the mandrel opposite the guide bar carried block, dies carried by the blocks, a pivoted lever, a link connecting the same to the pivoted die block, and a reciprocatory member having a linked connection with the lever and a slotted connection with the die carrying bar to permit lost motion.

3. In a machine of the class described, the combination with a mandrel, of a reciprocatory die carrying block, a slidable bar carrying the same and having a slotted upper end, guides for said bar, a pivoted die carrying block, dies carried by the block, a pivoted lever, a link connecting the same to the pivoted block, a reciprocatory member having a pin extending through the slot of the bar, a link connecting said pin to the lever, and an operating means having a yieldable connection with said reciprocatory member.

4. In a machine of the class described, the combination with a frame, of a mandrel, a semi-circular die carrying block, a vertically guided bar supporting the same and provided with a slot at its upper end, a U-shaped bar having a pin entering said slot, said U-shaped bar having reduced end portions forming bolts, springs encircling the bolts, an actuating member having openings for the passage of said bolts, and bearing against the springs, a second die block pivoted to the first, dies carried by the blocks, a lever pivoted to the frame of the machine, a link connecting the lever to the pivoted die block, and a link connecting the lever to the pin of said U-shaped bar.

5. In a machine of the class described, a pair of pivotally connected die blocks, bending dies carried thereby, and swaging dies extending laterally from the end portions of said blocks.

6. In a machine of the class described, the combination with a pair of pivotally connected die blocks, each having an arm extending therefrom at an obtuse angle to the block, swaging dies carried by the arms, and means for actuating the die blocks.

7. In a machine of the class described, bending dies, a carrying bar for one of them, a lug projecting from said bar, a slidable mandrel, a spring tending to hold said mandrel in operative position, a bell crank lever connected to the mandrel, and a catch carried by the bell crank lever and disposed in the path of movement of the lug.

8. In a machine of the class described, a movable mandrel, a pair of bending dies arranged to encircle the same, a carrying bar for said dies, and means under the control of said bar for moving the mandrel to inoperative position.

In testimony that I claim the foregoing as my own, I have hereto affixed my signature in the presence of two witnesses.

WILLIAM G. SHULTS.

Witnesses:
E. HUME TALBERT,
JAS. M. WALKER.